United States Patent [19]

Chlebina et al.

[11] Patent Number: 5,066,448
[45] Date of Patent: Nov. 19, 1991

[54] TREAD REMOVAL METHOD AND APPARATUS

[75] Inventors: Larry E. Chlebina; Norbert Majerus; John S. Rambacher, all of Akron, Ohio; Stephen L. Felder, Mesquite, Tex.

[73] Assignee: The Goodyear Tire & Rubber Company, Akron, Ohio

[21] Appl. No.: 592,164

[22] Filed: Oct. 3, 1990

[51] Int. Cl.⁵ .................................................. B29B 7/10
[52] U.S. Cl. ..................................... 264/334; 249/68; 264/328.3; 264/326; 425/441; 425/444; 425/450.1; 425/556
[58] Field of Search ............ 264/334, 315, 326, 328.3; 249/67, 68; 425/56, 36, 35, 46, 47, 49, 28.1, 115, 340, 436, 441, 393, 450.1, 436 RH, 438, 444, 451–459, 556, 445, 446, 392, 34.2

[56] References Cited

U.S. PATENT DOCUMENTS

| | | | |
|---|---|---|---|
| 1,373,229 | 3/1921 | Fording | 425/56 |
| 3,994,650 | 11/1976 | Nishimura et al. | |
| 3,994,653 | 11/1976 | Marangoni | 425/340 |
| 4,207,052 | 6/1980 | Satzler | 425/394 |
| 4,230,511 | 10/1980 | Olsen | 264/326 |
| 4,818,203 | 4/1989 | Majerus et al. | 425/115 |
| 4,826,416 | 5/1989 | Majerus et al. | 425/115 |
| 4,984,976 | 1/1991 | Kozachevsky et al. | 425/441 |

FOREIGN PATENT DOCUMENTS 61-276180 6/1988 Japan.

*Primary Examiner*—Jeffery Thurlow
*Assistant Examiner*—Mathieu Vargot
*Attorney, Agent, or Firm*—David L. King

[57] ABSTRACT

A method and apparatus for automatically removing an annular grooved tread from an initially closed segmented mold is described. The segmented mold has an annular cavity and a central core, and has both an axial direction and a radial direction. The method includes the steps of withdrawing a first plurality of segments, restraining radial movement of the tread at a plurality of locations from which segments have been withdrawn, withdrawing a second plurality of segments, retracting the restraint, and then removing the tread from the core by using an axially movable annular ring located above the upper half of the mold. The annular ring includes a plurality of push off devices, each device having a spring loaded radially retractable tread pusher component.

15 Claims, 10 Drawing Sheets

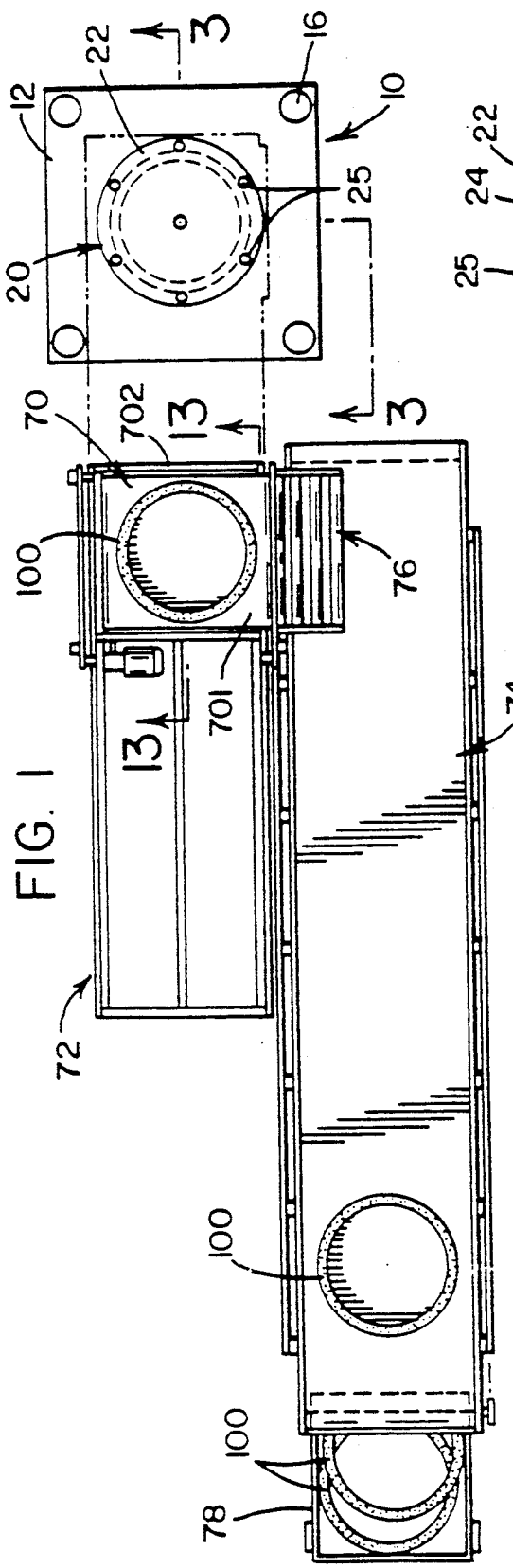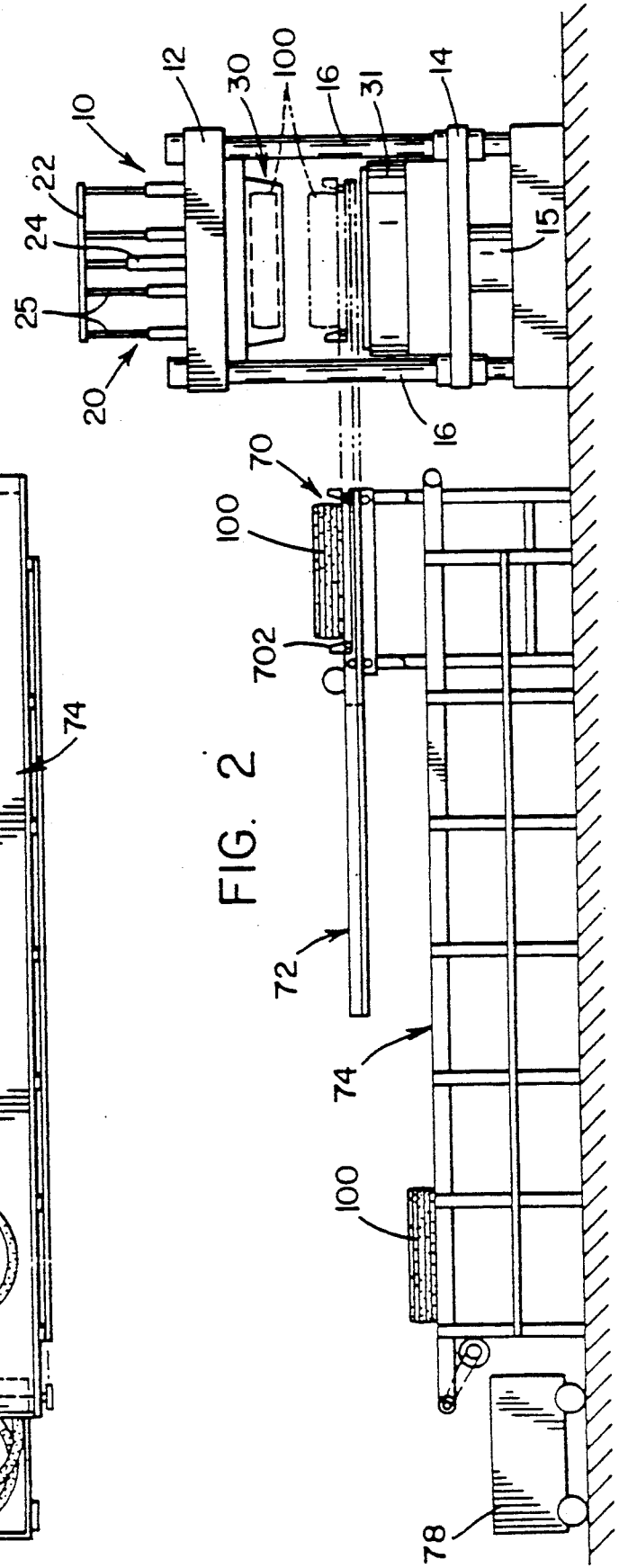

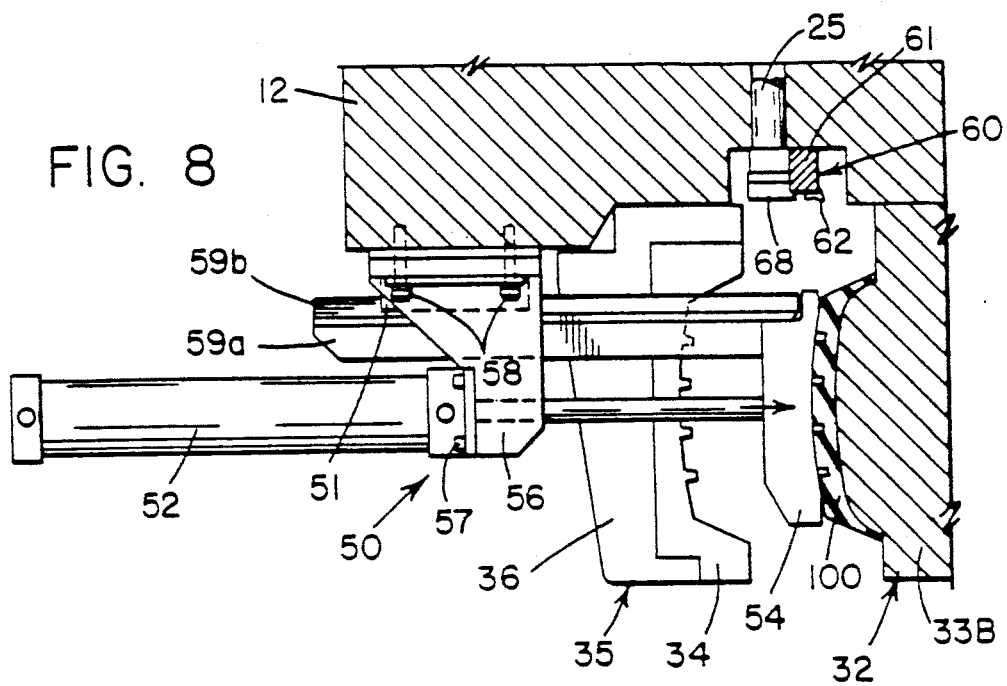
FIG. 8
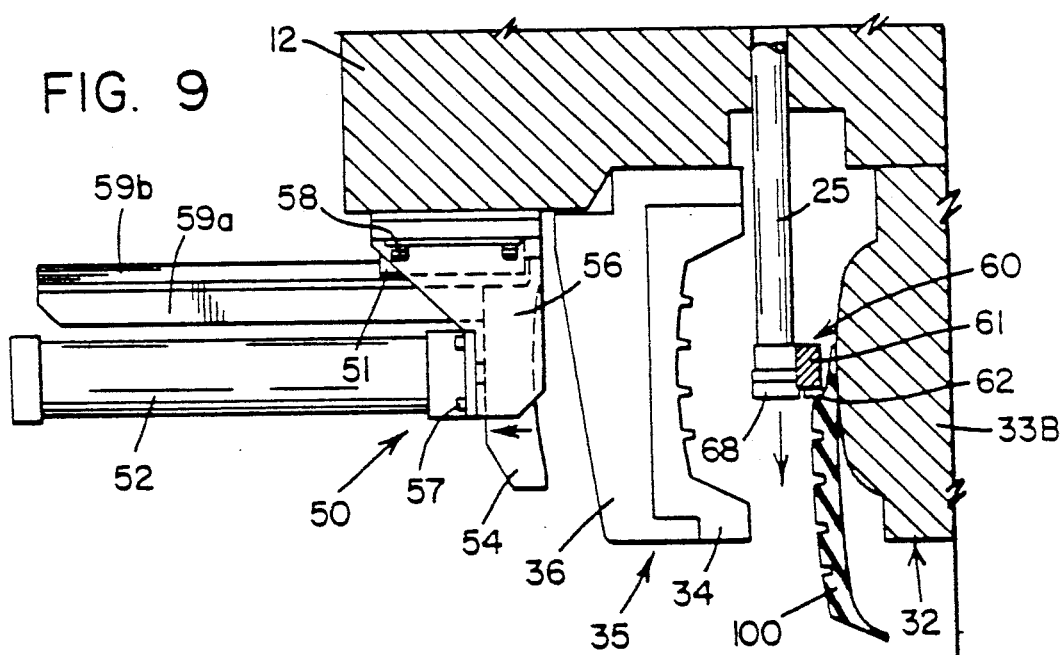
FIG. 9
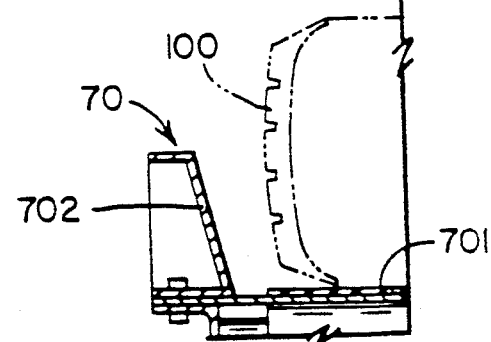

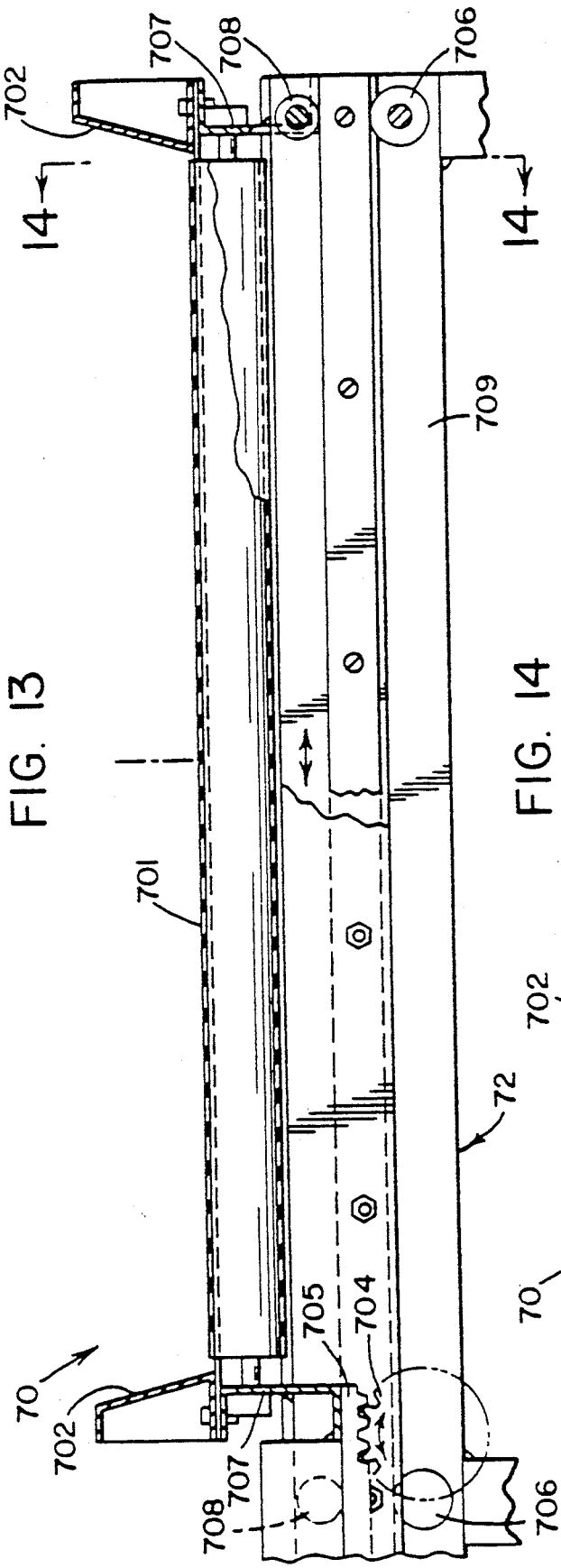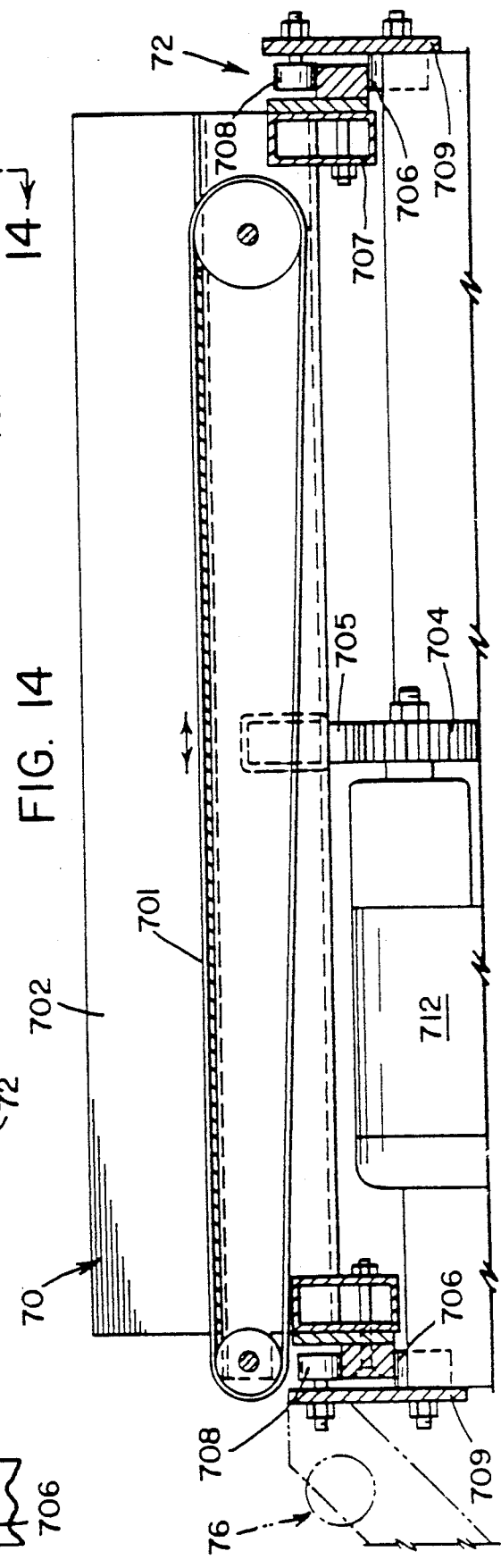

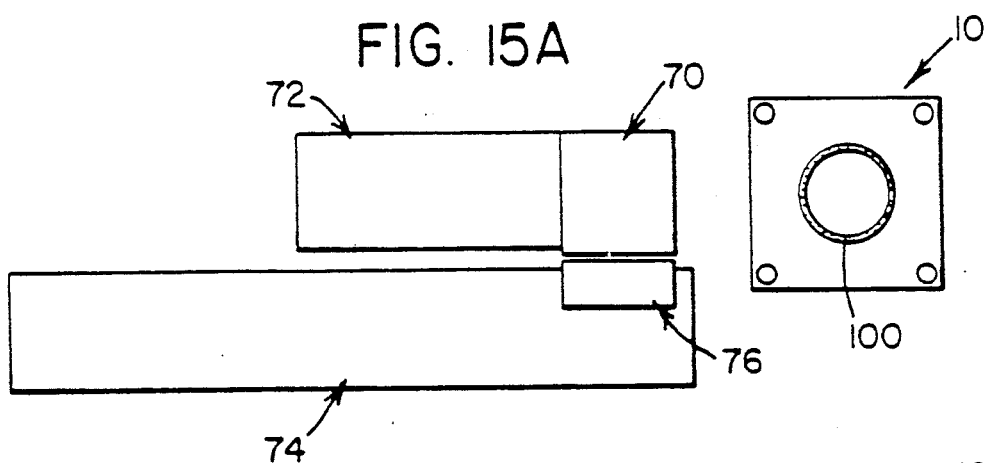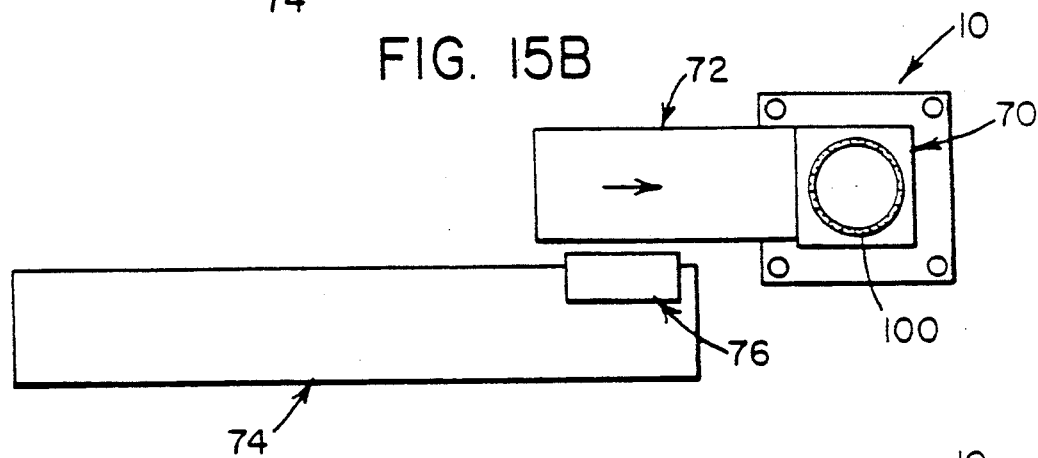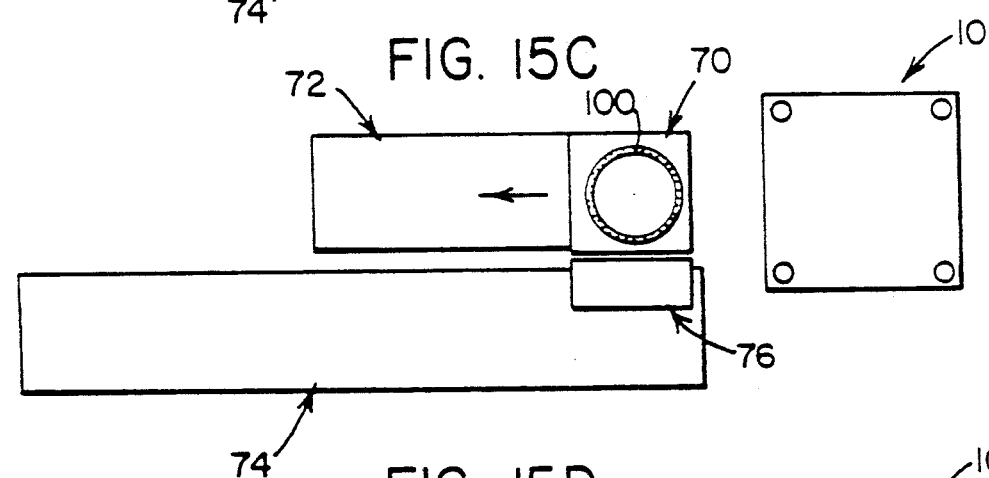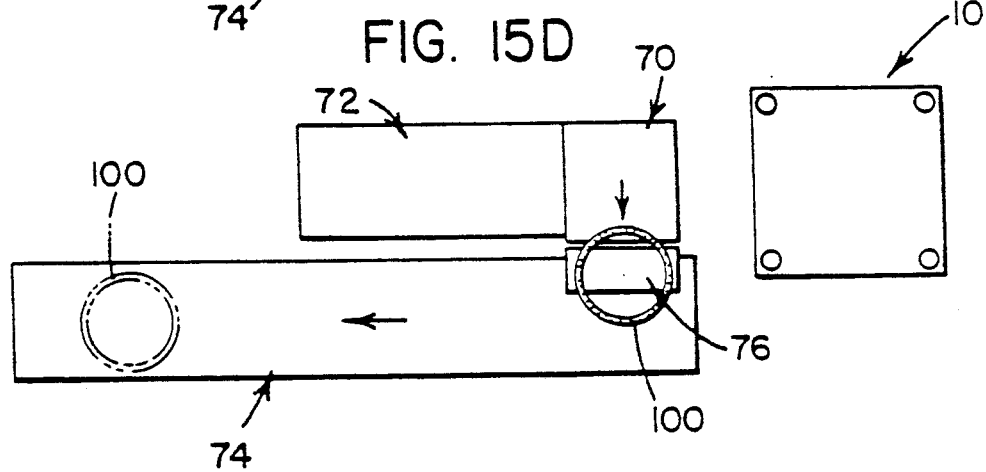

TREAD REMOVAL METHOD AND APPARATUS

BACKGROUND OF THE INVENTION

This invention relates to a method and apparatus for removing an annular grooved tread from an initially closed segmented mold. One of the key problems in molding a large elastomeric tread is the removal of the finished product from the mold. Particular attention has to be focused on efficiently stripping the tread from the mold without damaging the finished tread. A second consideration in molding an annular tread is that the molded tread match new tire tread designs as closely as possible. A third design consideration is to minimize the amount of undertread thickness in order to make the tread more efficient in terms of rolling resistance.

In order to achieve the above-mentioned objectives, those skilled in the art have developed a variety of methods and apparatus for tread removal. Conventional strippers and knockoffs used in injection molding of rigid articles do not work with an elastomeric annular grooved tread.

Simply opening the mold in order to remove the tread cannot be accomplished without resulting in tread damage. The grooved tread tends to remain in the mold cavity, and by failing to release from the mold, the tread is stretched beyond its elastomeric limits. The excessive stretching results in the undertread deforming such that the annular shape is lost. This deformation makes the tread unsuitable for use.

Attempts to manually strip annular treads from a mold have been found to be too time consuming. This labor intensive method of tread removal is costly, and further, introduces human error that can result in tread damage.

In order to facilitate tread removal, artisans have attempted to minimize the number of grooves and have placed generous draft angles on those grooves used on a molded tread. In so doing, they have minimized their ability to match new tire tread designs. In the past, it was generally accepted practice to minimize tread removal problems by requiring a greater than $1\frac{1}{2}°$ draft angle. Grooves with draft angles less than $1\frac{1}{2}°$ greatly increased the force required to remove the tread from the mold. Additionally, a variety of mold release agents were used to assist in releasing treads from the mold. In the art of molding, the use of release agents introduces a foreign contaminant into the product and is generally avoided where possible.

Further design compromises were made by thickening the undertread of the molded article so that the product could take more abuse in order to release the tread from the mold. This resulted in an increase in material usage and a decrease in tread performance. The thicker undertread causes an increase in rolling resistance.

The method and apparatus of the invention allows an annular grooved tread to be removed from a mold in an efficient and reliable fashion and does not limit the design of the tread in terms of groove patterns or draft angles. Rather, it permits use of $0°$ to $1\frac{1}{2}°$ draft angles on tread grooves and sipes.

Also, the invention enables the tread to be molded with a thin undertread, thus improving both the cost efficiency and the performance characteristics of the finished article.

RELATED ART

Majerus, in U.S. Pat. No. 4,818,203, issued Apr. 4, 1989, illustrates a tread mold with mold segments forming a circumferential curved mold cavity capable of producing arcuately shaped treads. The patent describes curved mold segments having curved tread forming surfaces that are slidably mounted on a support plate for radial movement of the mold segments into engagement with the core. Piston and cylinder assemblies between the support plate and the mold segments are positioned to retract the mold segments from a closed position and in engagement with the core to an open position spaced from the core permitting movement of the molded section of the tread to a position for molding the next section. Preferably, the mold segments are retracted from the molded tread in sequence starting with a first mold segment next to a tread end, and the remaining segments are then retracted in adjacent sequence to strip the tread from the mold and minimize the stretching of the tread. The mold segments may also be retracted in a different order, but at different times so that at least one of the segments remains extended. The Majerus patent as described permits manufacture of a continuous length of arcuately formed tread. The tread is clamped at both the open end and the trailing portion of the mold, thus permitting the mold segments to be stripped in a sequential sequence as described above.

Nishimura, in U.S. Pat. No. 3,994,650, issued Nov. 30, 1976, illustrates a method and apparatus for casting pneumatic tires utilizing a separable hard core to facilitate the removal of the tire from the mold. The separable hard core is composed of at least three segments and is toroidal in shape. At least one segment of the separable core is retracted in the radial direction and then moved in a direction which does not hinder retracted movement of the remaining segments. Subsequently, these remaining segments are retracted in a radial direction, and the cast tire can easily be removed from the mold assembly.

SUMMARY OF THE INVENTION

A method for removing an annular grooved tread from an initially closed segmented mold is described. The mold has segments surrounding a central core, thus forming an annular cavity. The mold has an axial direction and a radial direction. The method described comprises the steps of withdrawing a first plurality of segments, restraining the radial movement of the tread at a plurality of locations from which segments have been withdrawn, withdrawing a second plurality of segments, retracting the restraint, and removing the tread from the core.

The method may further comprise the step of pushing the tread off the core at a plurality of locations after the first and second pluralities of segments have been withdrawn.

The method may also further comprise the steps of catching the tread after the tread is pushed off the core and removing the tread from the vicinity of the mold.

In the above method of removing an annular grooved tread, the grooves may be molded with as low as $0°$ to $1\frac{1}{2}°$ draft angles. Another method of removing an annular tread includes the step of stretching the annular tread radially over the central core, the central core being radially convex. The method incorporating stretching the tread may further include the step of moving a pusher means, the pusher means contacting the tread at a plurality of locations and being moved axially and radially simultaneously as the tread is being stretched and pushed off the core.

An apparatus for removing an annular tread from a segmented mold, the mold having a central core and a plurality of radially movable mold segments, is described herein. The apparatus according to the present invention comprises a means for withdrawing a plurality of segments, a means for temporarily retraining the tread at a plurality of locations corresponding to regions previously occupied by one or more of the first plurality of segments, a means for withdrawing a second plurality of segments, a means for retracting the restraint, and a means for removing the tread from the core.

The means for removing the tread from the core may further comprise a means for pushing the tread off the core. The apparatus may further comprise a means for catching the tread and a means for removing the tread from the vicinity of the mold.

DEFINITIONS

The invention may also be better understood in the context of the following definitions which are applicable to both the specification and the appended claims.

"Tread" means a molded rubber component which, when bonded to a tire casing, includes that portion of the tire which comes in contact with the road when the tire is normally inflated and under normal load. Tread, as used herein, further includes a molded rubber component which can be utilized as a track and includes that portion of the track which comes into contact with the road.

"Axial" is used herein to refer to lines or directions that are parallel to the centerline of the central core and also parallel to the axis of rotation of the formed tread.

"Central core" means that portion of the mold that forms the inner surface of the tread.

"Mold segment" means that portion of the mold which forms the outer surface of an annular tread to include the ground contacting grooved surface of the tread. As used herein, mold segment is a component of the mold that is radially outward of a central circular core. A plurality of such components circumferentially surround the circular core, thus forming an annular cavity for forming a molded tread.

"Radial" and "radially" are used to mean directions radially toward or away from the axis of rotation of the molded tread or the centerline of the central core.

"Undertread" means the radially inner part of the tread, the undertread thickness being the thickness of material directly radially inward of tread grooves.

"Sipes" are small slots that are molded into the ribs of the tire and that subdivide the tread surface and improve traction.

BRIEF DESCRIPTION OF THE DRAWINGS

FIG. 1 illustrates a plan view of an injection mold press and tread catching means and removal means.

FIG. 2 illustrates an elevational view of the press and tread catching means and tread removal means.

FIG. 8 is a view along line 8—8 of FIG. 7C illustrating the tread restraining means.

FIG. 9 is a view along line 9—9 of FIG. 7D illustrating the tread being pushed off the central core.

FIG. 13 is a cross sectional view along line 13—13 of FIG. 1 depicting the tread catching means.

FIG. 14 is a cross sectional view along line 14—14 of FIG. 13 further illustrating the tread catching means.

FIGS. 15A–15D illustrate the operation of the tread catching means and tread removal means.

DETAILED DESCRIPTION OF THE INVENTION

Figure 3:
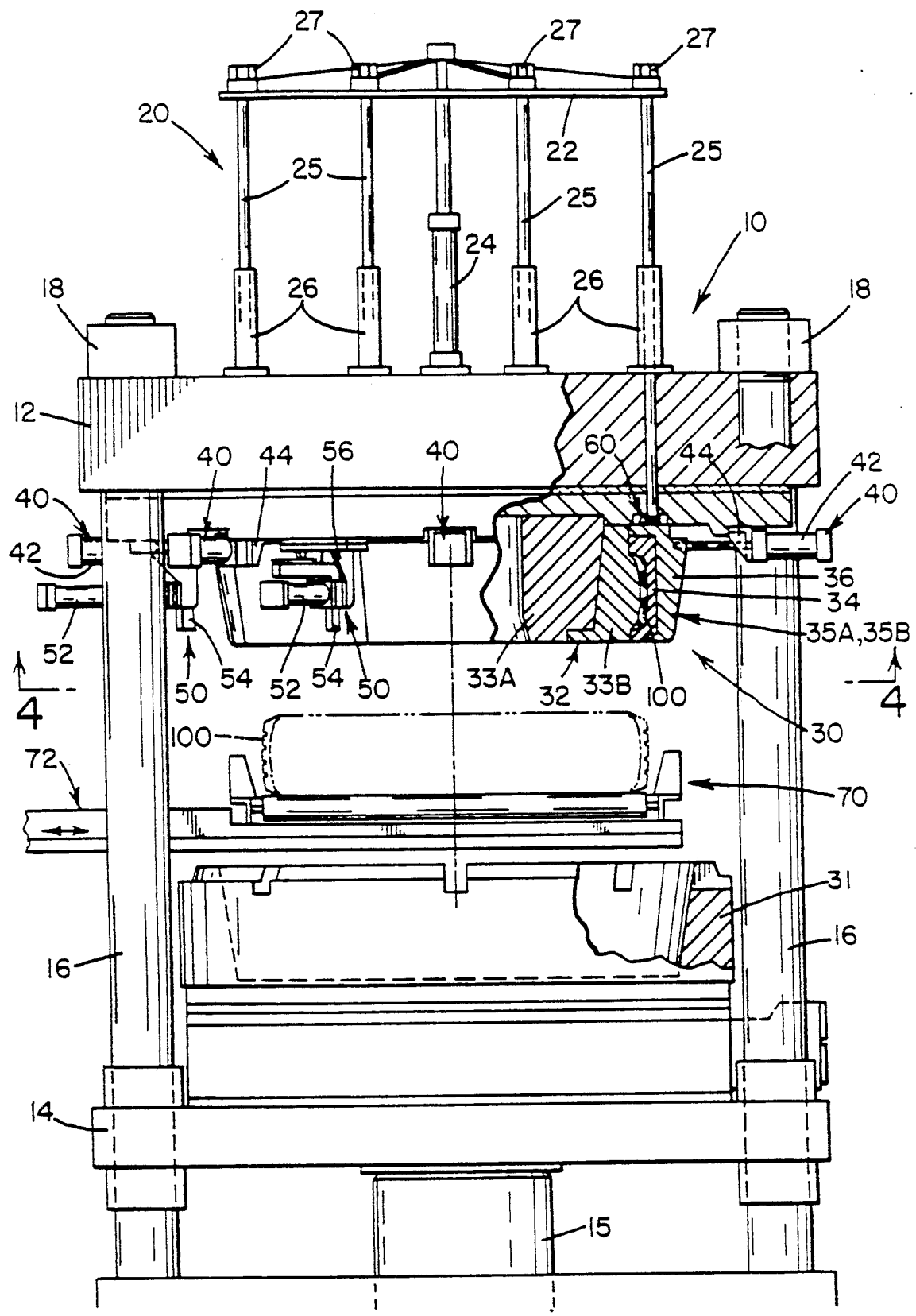
FIG. 3 illustrates an enlarged cross sectional view along line 3—3 of FIG. 1 and depicts the mold press and tread catching means.

A method is described for removing an annular grooved tread from an initially closed segmented mold, the mold having mold segments that are located radially outward of and surround a central core, thus forming an annular cavity. The mold has an axial direction parallel to a line going through the center of the central core and has a radial direction that is perpendicular to the centerline of the core. The mold segments are movable in a radial direction. The method of removing the tread comprises the steps of:

a) withdrawing a first plurality of segments;
b) restraining radial movement of the tread at a plurality of locations from which segments have been withdrawn;
c) withdrawing a second plurality of segments;
d) retracting the restraint; and
e) removing the tread from the core.

The method may further comprise the step of pushing the tread off the core at a plurality of locations after the first and second pluralities of segments have been withdrawn.

The method may further include the steps of catching the tread after the tread is pushed off the core and removing the tread from the vicinity of the mold.

In the drawings, the same numerals are used to designate the same components or items in the several views. An apparatus for carrying out the above method is illustrated in FIGS. 1–6 and 8–15d.

With reference to FIGS. 1 and 2, the overall injection molded press 10 with tread catching means 70, a means 72 for removing the tread from the vicinity of the mold, a means 74 for removing the tread from the vicinity of the press, and a cart 78 are illustrated.

With reference to FIG. 3, the overall injection mold press 10 with tread forming segmented mold 30 is illustrated. The press 10 comprises a hydraulic cylinder 15 connected to a lower platen 14. The lower platen 14 is slidably mounted to four guide bars 16. At the upper end of the press 10 is located an upper platen 12. The upper platen 12 is rigidly attached to the four guide bars 16 and is fixed in position by four large threaded nuts 18.

As illustrated in FIG. 3, the segmented mold 30 comprises a lower mold retaining ring 31, which is attached to the lower platen 14, and the segmented mold components 35A,35B that are slidably connected to the upper platen 12. The mold segments 35A,35B are illustrated in a closed position surrounding a central core assembly 32, the central core assembly 32 comprising a radially inward component 33A and a radially outward component 33B. The radially outward component 33B is chromium-plated at the radially outer surfaces to facilitate tread removal.

The segmented mold components 35A,35B are comprised of a tread-forming, radially-inward component 34 and a radially-outward component 36. The radially-outward component 36 is connected to a mold segment withdrawing means 40. The mold segment withdrawing means 40 as depicted in FIG. 3 consists of a hydraulic cylinder 42 connected to a bracket 44, the bracket 44 being rigidly mounted to the upper platen 12. Additionally, attached to the upper platen 12 is depicted a tread restraining means 50, the tread restraining means 50 comprising a pneumatic cylinder 52 connected to a restraint component 54, the tread restraining means 50 being rigidly mounted to a bracket 56, the bracket 56 further being rigidly attached to the upper platen 12.

Further illustrated in FIG. 3 is the means 20 for pushing the tread off the core 32, the means 20 comprising an upper plate 22 mounted to a hydraulic cylinder 24, the cylinder 24 being connected to the upper plate 22 at the radial center location and rigidly mounted to the upper platen 12. Near the radial extremes of the plate 22 are mounted a plurality of axially slidable push rods 25, the push rods 25 being rigidly connected to the upper plate 22 and bolted to it by means of nuts 27. The push rods 25 slide through bushings 26, the bushings 26 being mounted above the upper platen 12. The push rods 25 extend through the upper platen 12. Attached to the lower axial end of the push rod 25 is a means 60 for pushing the tread off the core 32. As illustrated in FIG. 3, the means 60 for pushing the tread off the core 32 is recessed into the upper platen 12 and is positioned directly over the radially movable mold segment 35A,35B.

Illustrated between the segmented mold 30 and the lower mold retaining ring 31 are a means 70 for catching and a means 72 for removing the tread from the vicinity of the mold 30. The means 70 includes the means for catching the tread 100, a roller means 76 for dropping the tread 100 and a means 74 for removing the tread 100 from the vicinity of the press 10.

Figure 4:
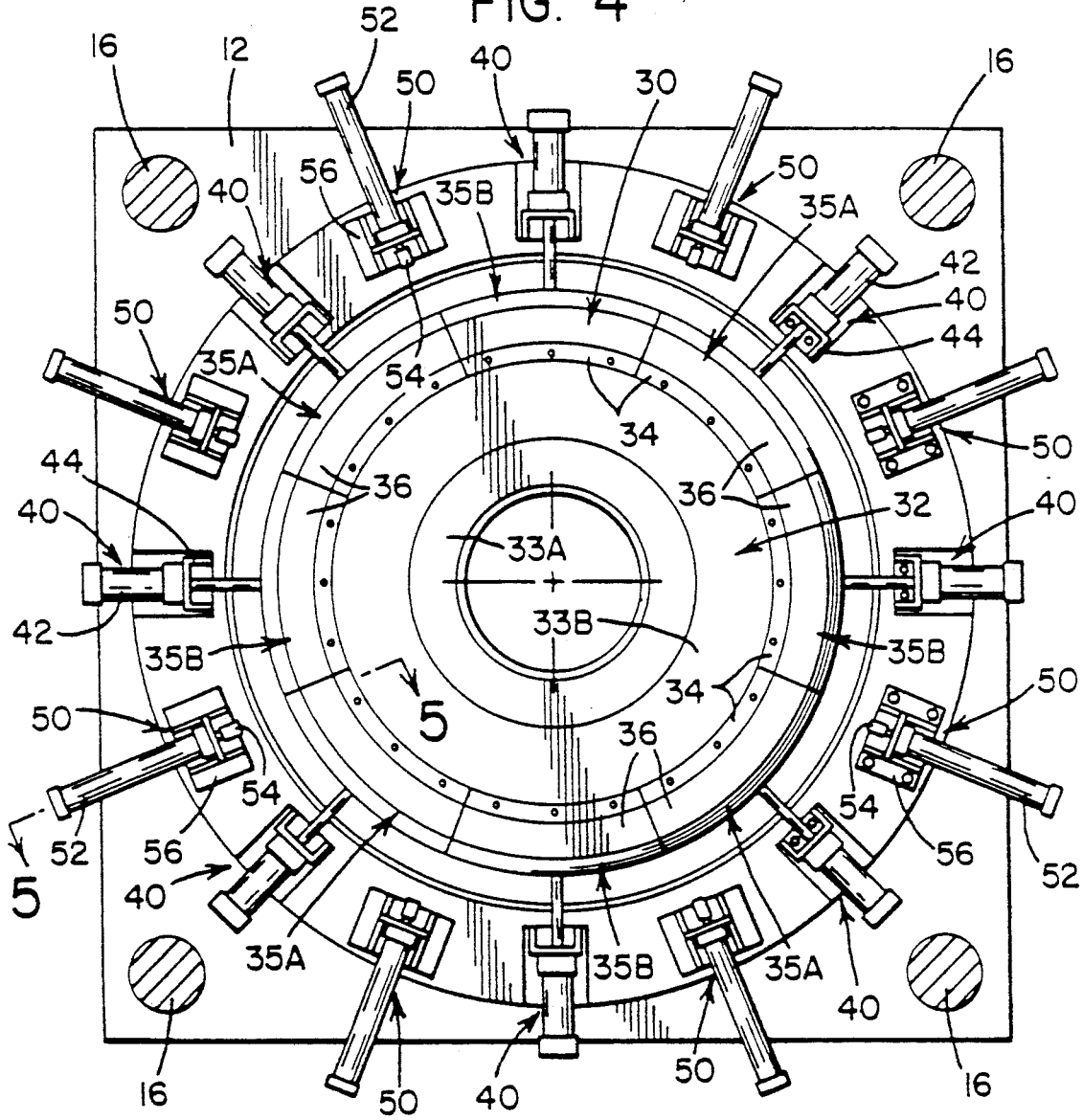
FIG. 4 illustrates a cross sectional view of the press along line 4—4 of FIG. 3.

In FIG. 4, a cross sectional view of the press 10 is shown. The view is looking upward into the upper platen 12. The upper platen 12 is rigidly attached to the press 10 at the axial guide bar location 16. Centered and mounted to the upper mold platen 12 is the segmented mold 30. In the illustrated embodiment, the central core assembly 32 comprises the components 33A,33B and is surrounded by eight mold segments 35A,35B, the mold segments 35A,35B comprising components 34,36. The segments 35 circumferentially surround the central core 32. That portion of the mold segment depicted as 36 is connected to a means 40 for withdrawing the segment 35, the means 40 for withdrawing the mold segment 35 comprising a hydraulic cylinder 42 and a bracket 44 rigidly mounted to the upper platen 12, the means 40 for withdrawing the mold segment 35 being attached to each radially movable mold segment 35 as illustrated in FIG. 4. Eight means 40 for withdrawing are shown in the illustrated embodiment. Attached to the upper platen 12 is a means 50 for restraining the annular tread 100. The means 50 for restraining comprises a pneumatic cylinder 52 and a tread restrainer 54 and a bracket 56. The bracket 56 is rigidly attached to the upper platen 12.

Figure 5:
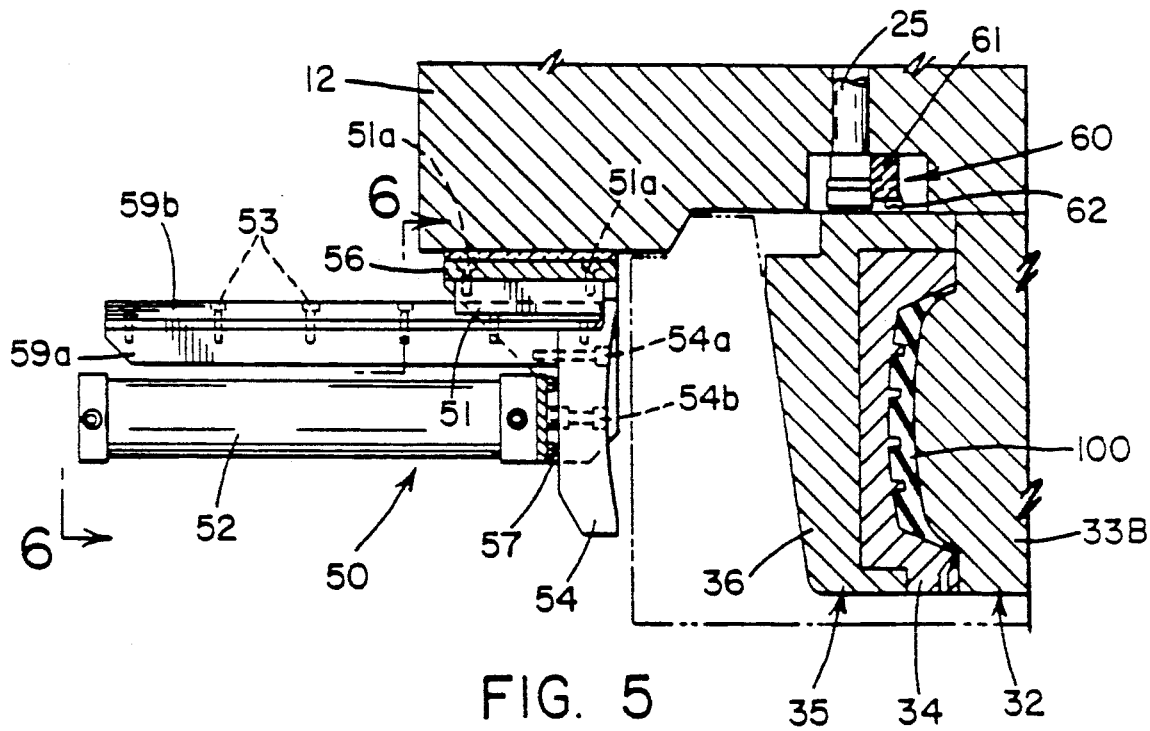
FIG. 5 illustrates a further enlarged cross sectional view along line 5—5 of FIG. 4 and depicts the mold press and a means for temporarily restraining the tread.
Figure 6:
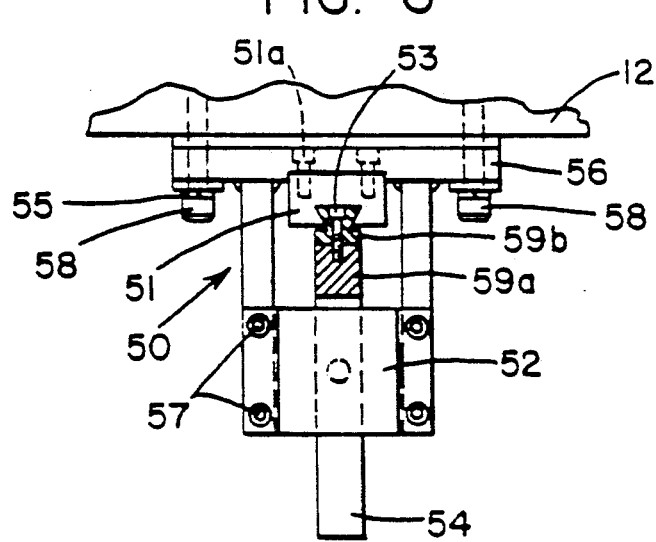
FIG. 6 is a view along line 6—6 of FIG. 5 of the tread restraint mechanisms.

In FIG. 5, the means 50 for restraining is shown in greater detail. The pneumatic cylinder 52 is shown mounted to the bracket 56 and is securely attached thereto by means of screws 57. The tread restrainer 54 is rigidly affixed to the pneumatic cylinder 52 and to a guide bar assembly 59a,59b by means of screws 54a,54b. The guide bar mechanism 59a,59b is attached by means of threaded fasteners 53. The guide bar assembly 59a,59b is slidably retained in a guide mechanism 51. The guide mechanism 51 is rigidly bolted to the bracket 56 by means of threaded fasteners 51a. The bracket assembly 56 is bolted to the upper platen 12 by means of a threaded fastener 58 and lock washers 55.

As is illustrated in FIG. 5, the mold segment 35 comprising an outer component 36 and tread forming component 34 is depicted in the radially closed position surrounding the central core 32. Encapsulated between the mold segment 35 and the core is a molded tread 100. Above the mold segment 35 is the means 60 for pushing the tread off the central core 32. The means 60 for pushing the tread off the central core 32 is nested in the upper platen 12, and the means 60 for pushing is rigidly attached to the slidable push rod 25.

Figure 10:
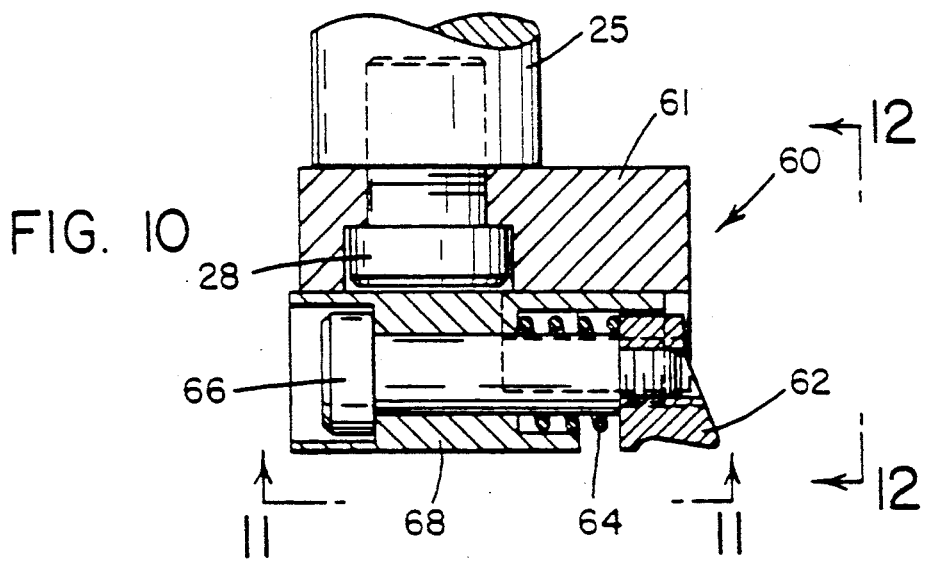
FIG. 10 is a cross sectional view along line 10—10 of FIG. 7D depicting the tread pusher mechanism.
Figure 11:
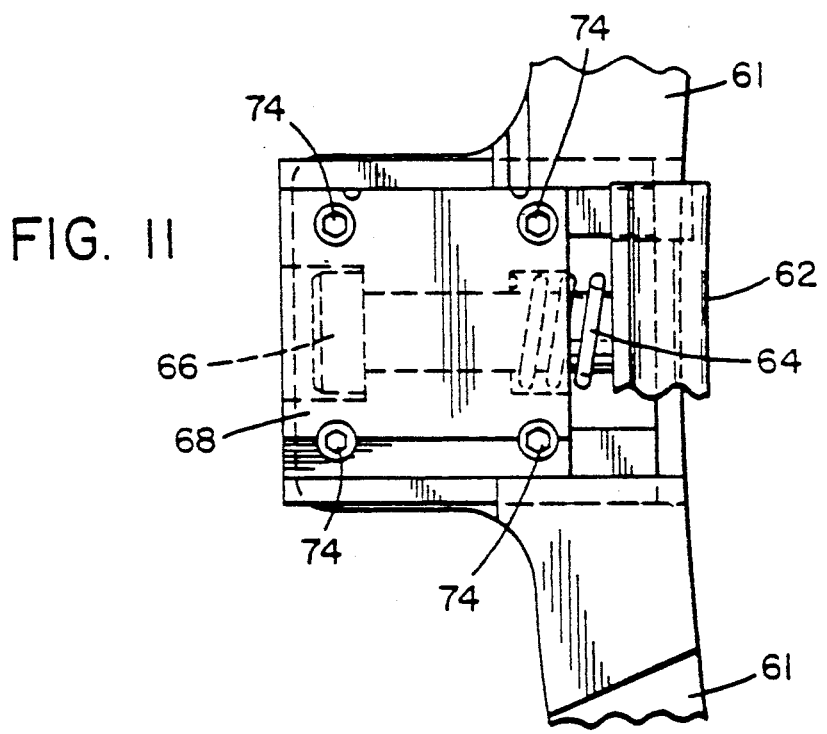
FIG. 11 is a bottom view of the tread pusher taken from FIG. 10 along line 11—11.
Figure 12:
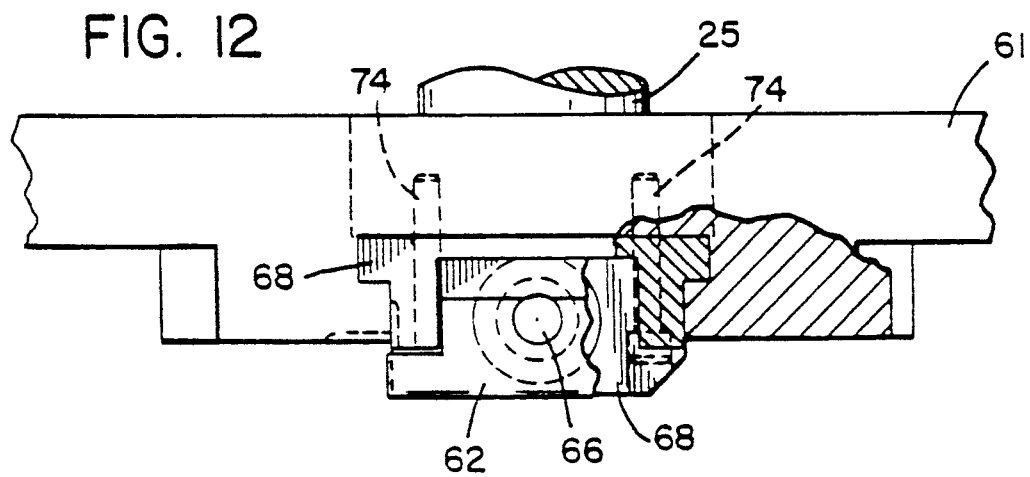
FIG. 12 is a perspective view of the tread pusher taken along line 12—12 of FIG. 10.

As shown in FIGS. 10, 11 and 12, the means for pushing 60 comprises an annular ring 61, the annular ring 61 being bolted to the push rod 25 by means of a threaded fastener 28. The means for pushing further comprises a housing 68 that is rigidly attached to the annular ring 61 by means of threaded fasteners 74. Within the housing assembly 68 is a tread pusher element 62, a retained compression spring 64 and a threaded fastener 66, connected to the pusher means 60 and bolted through the housing 68.

With reference to FIGS. 13 and 14, the means 70 for catching the tread 100 is shown, the means 70 being slidably mounted to the means 72 for removing the tread from the vicinity of the mold. The means 72 includes a rigid frame 709 for supporting the means 70 for catching the tread. Mounted to the frame 709 are four upper rollers 708 and four lower rollers 706, and a pinion gear 704 connected to a drive motor 712.

The means 70 for catching the tread includes a conveyor mechanism 701, flanges 702 mounted to a frame 707. As shown in FIGS. 13 and 14, the frame 707 is rigidly attached to a rack gear 705. The rack gear 705 is axially movable relative to the frame 709 of the means 72 and is engaged with the pinion drive gear 704. The frame 707 of the catching means 70 is slidably movable axially into and away from the press 10.

In an alternative embodiment, the pinion gear 704 and drive motor 712 can be replaced by a hydraulic cylinder. The cylinder is used to move the means for catching 70 the tread axially into or away from the press 10.

The conveyor mechanism 701 as illustrated includes a belt and a pair of rollers. The movement of the belt is transverse to the axial movement of the catching means 70. The conveyor 701 is powered by an electric motor, not shown.

In FIG. 14, the roller mechanism 76 is depicted in phantom attached to the frame 709.

The apparatus described above can be used to remove an annular grooved tread from a segmented mold in the following manner. The means 70 for catching the tread 100 is withdrawn from the mold press area. The lower platen 14 with mounted lower retaining ring 31 attached is moved into a mold closed position when the hydraulic cylinder 15 raises the lower platen such that the retaining ring 31 makes firm engagement with the outer surface of the segmented mold 30, the segmented mold being connected to the upper platen 12. Elastomeric material is then injected into the mold cavity to form an annular tread 100. The lower platen 14 is withdrawn into the mold open condition, freeing the mold segments 35A,35B and allowing them to be radially withdrawn.

Figure 7A:
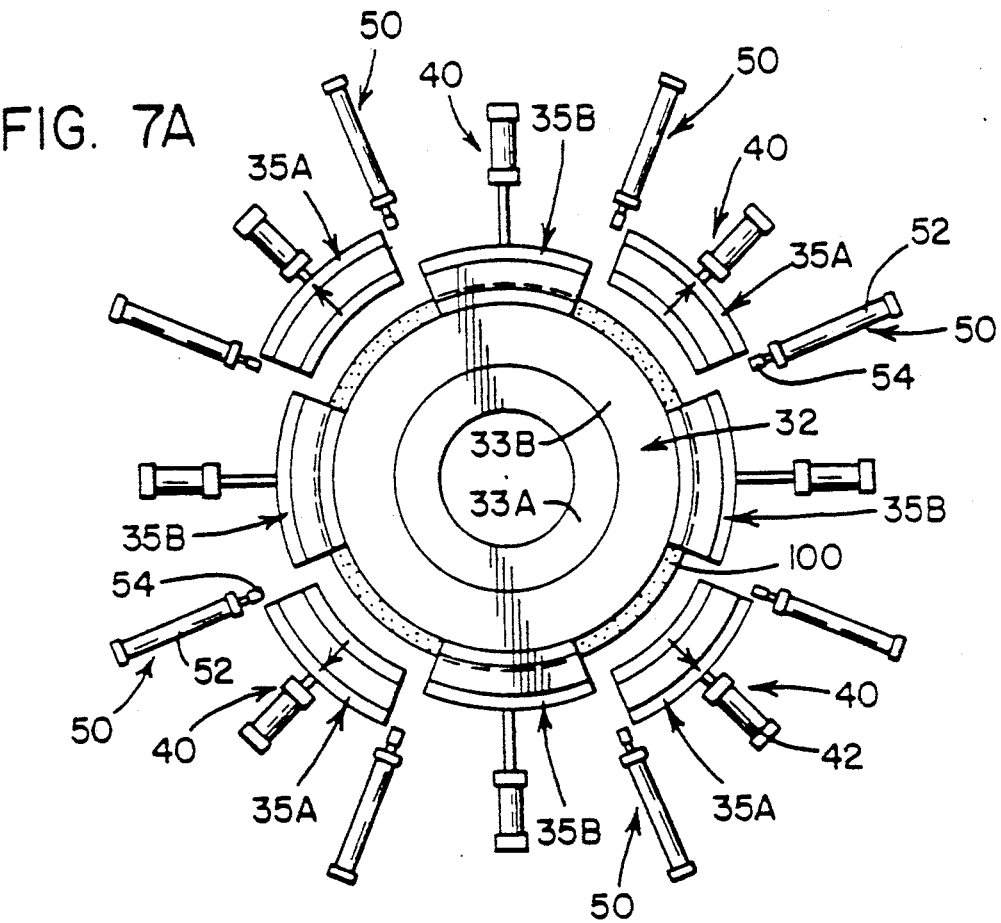
FIG. 7A is a view illustrating withdrawal of a first plurality of mold segments.
Figure 7B:
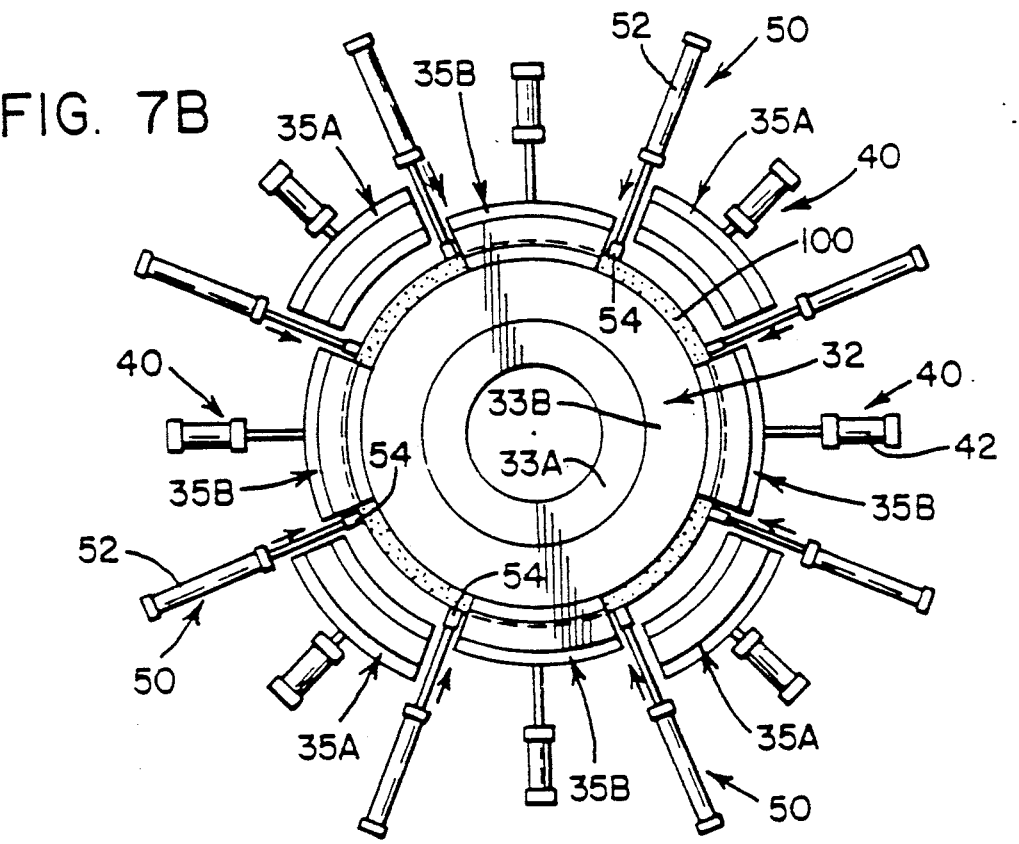
FIG. 7B illustrates a view of a plurality of restraining means contacting the tread.

With reference to FIG. 7A, as illustrated, the elastomeric tread 100 is shown around the central core assembly 32. The means for withdrawing 40, a first plurality of segments 35A are actuated such that mold segments 35A are moved radially outwardly and free of engagement with the molded tread. As depicted in FIG. 7A, the mold segments 35B, a second plurality of segments 35B, remain in the mold closed position and in contact with the tread surface. As the first plurality of segments is withdrawn, the second plurality of segments 35B restrain the tread 100, thus permitting release of the tread 100 from engagement with the first mold segments 35A. As depicted in FIG. 7A, the means 50 for restraining the tread 100 are in a retracted and non tread-contacting position. With reference to FIG. 7B, the means 50 for restraining are actuated such that the tread restrainer 54 is moved radially inward in direct proximity of the tread 100. These means 50 are moved into position at a plurality of locations from which segments 35A have been withdrawn. In the preferred embodiment, the restraining means 50 are brought into firm contact with the exposed tread surface at these plurality of locations. It should be noted, however, that mere proximity to the tread in these areas is sufficient to provide a means for restraining the tread from radial movement as the remaining mold segments 35B are withdrawn. In the preferred method, the first segments 35A are adjacent to a second segment 35B in an alternating pattern as depicted in FIGS. 7A-7D.

An alternative method of restraining the tread could be accomplished by extending the first plurality of mold segments 35A into close proximity with the tread after these segments have been freed from the tread. The first plurality of segments 35A act as the restraint enabling the second plurality of segments 35B to be withdrawn. In practice, it was found that the tread occasionally re-engaged itself back onto the restraining first segments 35A when utilizing this method of tread removal. Therefore, the preferred method is utilization of a separate and more positive and reliable restraint means to ensure that the tread 100 is completely disengaged from the mold segments 35.

Figure 7C:
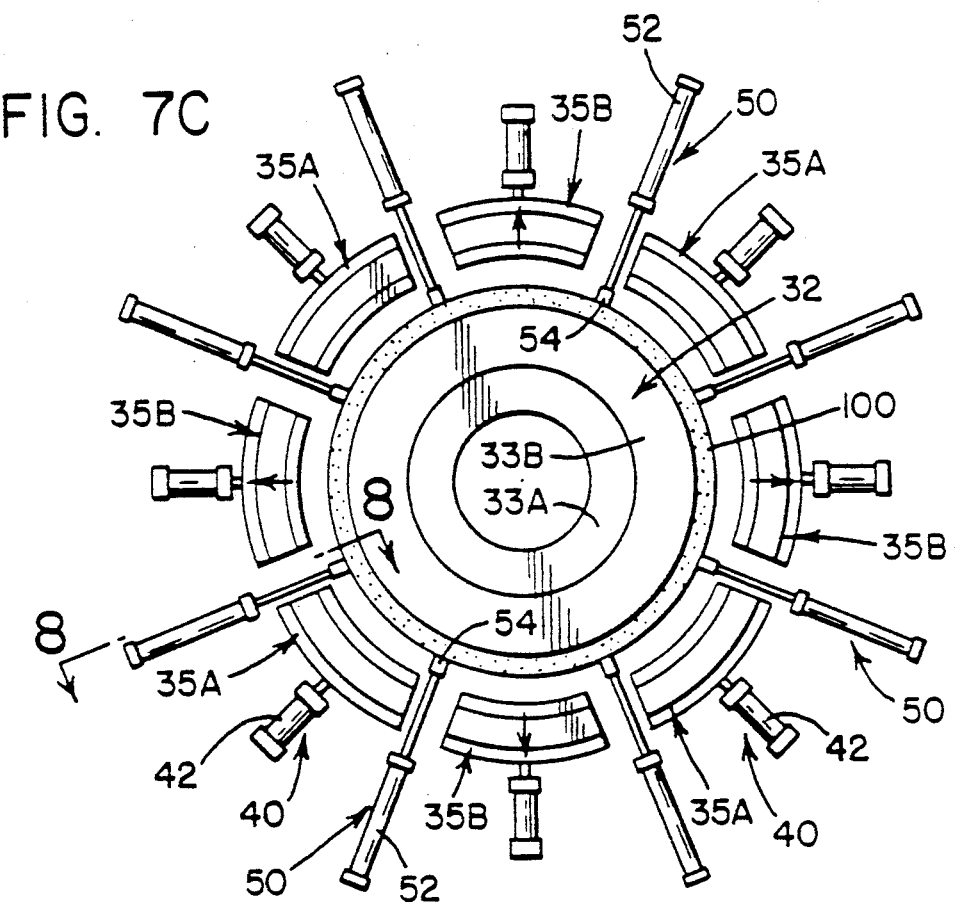
FIG. 7C is a view illustrating withdrawal of a second plurality of mold segments.

FIG. 7C depicts the second plurality of mold segments 35B being withdrawn from radial contact with the tread 100, the restraining means 50 preventing the tread from moving radially outwardly with the withdrawn mold segments.

Figure 7D:
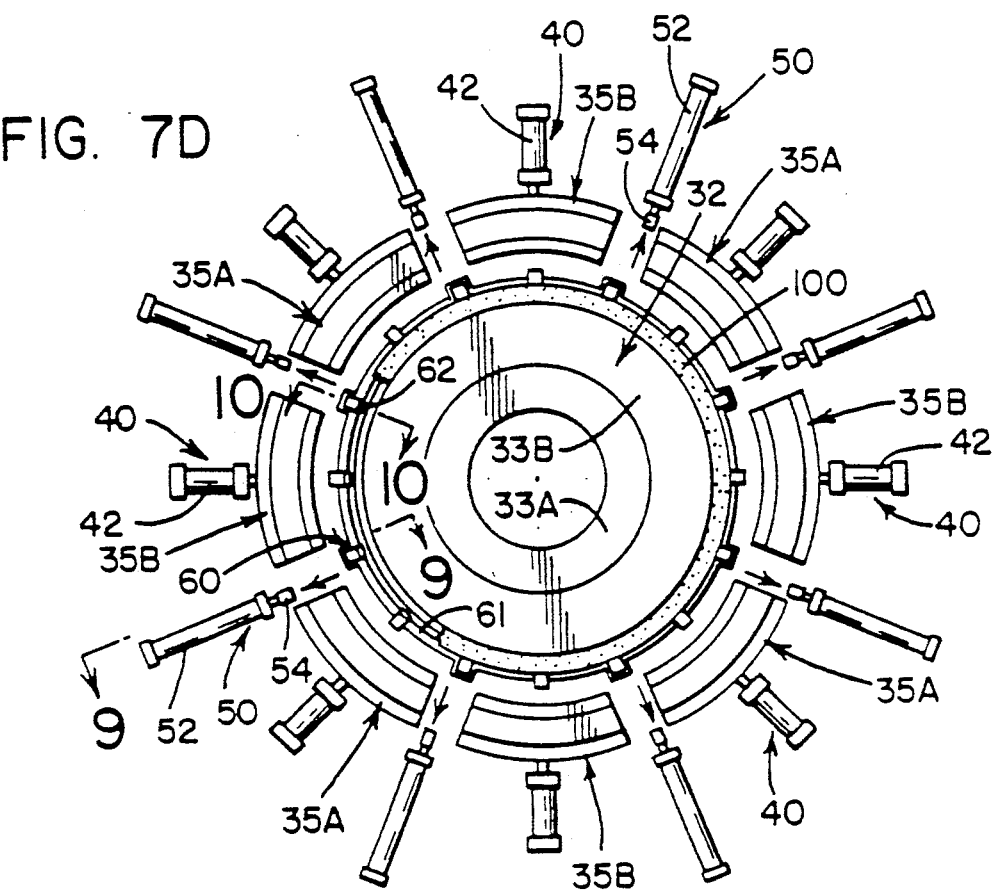
FIG. 7D is a view illustrating retraction of the plurality of restraining means.

FIG. 7D illustrates the restraining means 50 being withdrawn from contact with the tread 100. After retracting the restraint 50, the tread is left attached to the central core 32. FIG. 8 illustrates the mold segment in an open position with the restraining means in contact with the tread. FIG. 9 shows the mold segments 35A,35B still in the open position with the restraining means 50 withdrawn and retracted from tread 100 contact.

Once the restraining means 50 is withdrawn, a means 20 for removing the tread 100 from the core 32 is actuated. As shown in FIG. 9, a means for pushing 60 the tread 100 off the core 32 is illustrated, the means 60 being connected to the pusher rods 25 which move axially downward until the tread 100 is pushed over and off the central core 32. The phantom line in FIG. 9 shows the tread 100 dropping off the core 32. The step of pushing the tread 100 off the core 32 occurs at a plurality of locations after the first and second pluralities of mold segments 35A,35B have been withdrawn. As illustrated in FIG. 9, a means 70 is provided for catching the tread after the tread is pushed off the core. The tread 100 is then removed from the vicinity of the mold. The method described above can be utilized for removing a grooved tread with the grooves being molded with equal to or greater than a 0° draft angle.

As depicted in FIGS. 8 and 9, the central core 32 may have a convex curvature, thus requiring the pusher means 60 to contact the tread 100 in a plurality of locations and to move axially and radially simultaneously as the tread 100 is being stretched and pushed off the core 32. In order to accomplish the axial and radial movement, the pusher means 60 is designed with a pushing element 62 connected to a bolt 66 which is spring loaded 64, thus enabling the pushing element 62 to radially compress outwardly, allowing the pushing elements 62 to push the tread 100 axially downward while simultaneously deflecting radially inward. This feature is shown in FIGS. 10-12. As depicted in FIGS. 7d and 10-12, the means for pushing 60 the tread 100 off the core 32 comprises a plurality of axially movable and radially retractable tread pushing elements 62. The apparatus as illustrated further includes an axially movable annular ring 61, the pusher means 60 being attached to the annular ring 61. The pusher means 60 contacts the tread, the downward axial movement of the ring 61 initially releases the tread from the core while the pusher means 60 maintains contact with the tread 100 pushing the tread 100 axially downward while never contacting the core 32. The pushing elements 62 radially deflect outwardly allowing the tread 100 to clear the convex curvature of the core 32.

In the illustrated embodiment, as depicted in FIGS. 7A-7C, the segmented mold 30 comprises eight radially movable mold segments 35A,35B. A first plurality of four segments 35A is withdrawn as depicted in FIG. 7C. The temporary restraining means 50 restrains the tread 100 at a plurality of locations; in the illustrated embodiment eight restraining means 50 are shown. The tread restrainers 54 are radially movable and are attached to hydraulic cylinders 52, one cylinder 52 being attached to each of the eight tread restrainers 54. The tread restrainers occupy a location where the first plurality of mold segments 35A has been withdrawn. The tread restrainers 54 permit a second plurality of mold segments 35B to be withdrawn in the illustrated embodiment the four remaining mold segments 35B are moved radially outwardly by means of a hydraulic cylinder 42 attached to each of said mold segments 35B.

After the lower platen 14 of the mold 30 is moved axially downward, a means for catching 70 the tread is inserted between the upper platen segmented mold and the lower platen then the method of tread removal is initiated such that the tread upon being removed from the core drops into the means for catching 70 a tread. The tread is then removed from the proximity of the mold press, and the means for catching 70 the tread is withdrawn from the press 10 prior to raising the lower platen 14 and injection molding a second tread 100.

As illustrated in FIGS. 15A-15D, the above recommended method of catching and removing the tread is accomplished in the following sequence:

1. A tread is molded while the means 70 for catching and the means 72 for removing is in a retracted position (ref. FIG. 15A).

2. After the lower platen lowers, the means 72 for removing the tread from the vicinity of the mold is moved such that the means 70 for catching the tread is positioned under the tread. The movement is accomplished by actuating the drive motor 712 which rotates the pinion gear 704, moving the rack 705, which in turn moves the catching means 70 into alignment under the mold 30. The tread removal from the mold is initiated, and the tread 100 falls into the catching means 70 (ref. FIG. 15B).

3. The drive motor 712 is actuated, withdrawing the catching means 70 until the catching means 70 is moved back into the retracted position (ref. FIG. 15C).

4. The conveyor mechanisms 701 is then activated, moving the tread transversely relative to the press 10 and placing the tread 100 on an inclined roller mechanism 76, the tread 100 sliding over the roller mechanism 76 and falling onto the means 74 for removing the tread from the vicinity of the press (ref. FIG. 15D).

What is claimed is:

1. A method for removing an annular grooved tread from an initially closed segmented mold, the segmented mold having an annular cavity formed by a plurality of mold segments circumferentially surrounding a central core, the mold also having an axial and a radial direction, the method comprising the steps of:
   a) radially withdrawing a first plurality of segments;
   b) restraining radial movement of the tread at a plurality of locations from which segments have been withdrawn by engaging the tread at said locations with radially movable tread restrainers
   c) radially withdrawing a second plurality of segments;
   d) radially retracting the tread restrainers; and
   e) removing the tread from the core.

2. The method of claim 1, further comprising the step of pushing the tread off the core at a plurality of locations after the first and second pluralities of segments have been withdrawn.

3. The method of claim 2, further comprising the steps of:
   catching the tread after the tread is pushed off the core; and
   removing the tread from the vicinity of the mold.

4. The method of claim 1 wherein the removal of the annular tread includes removing a grooved tread, the grooves being molded with equal to or greater than a 0° draft angle.

5. The method of claim 2 further including the step of stretching the annular tread radially over the central core, the central core being radially convex.

6. The method of claim 5 including the step of moving a pusher means, the pusher means contacting the tread at a plurality of locations and being moved axially and radially simultaneously as the tread is being stretched and pushed off the core.

7. An apparatus for removing an annular tread from a segmented mold, the mold having a central core and a plurality of radially movable mold segments, the apparatus comprising:
   a means for withdrawing a first plurality of segments;
   a means for temporarily restraining the tread at a plurality of locations corresponding to regions previously occupied by one or more of the first plurality of segments, said temporary restraining means comprising a plurality of radially movable tread restrainers;
   a means for withdrawing a second plurality of segments;
   a means for withdrawing the temporary tread restraining means; and
   a means for removing the tread from the core.

8. The apparatus of claim 7 further comprising a means for pushing the tread off the core.

9. The apparatus of claim 8 further comprising a means for catching the tread and a means for removing the tread.

10. An apparatus as in claim 7 wherein the means for withdrawing a first plurality of segments comprises a plurality of hydraulic cylinders, one cylinder being attached to each radially movable mold segment.

11. An apparatus as in claim 7 wherein the means for temporarily restraining the tread at a plurality of locations comprises a plurality of tread restrainers attached to pneumatic cylinders, one cylinder being attached to each tread restrainer.

12. An apparatus as in claim 7 wherein the means for withdrawing a second plurality of segments comprises a plurality of hydraulic cylinders, one cylinder being attached to each radially movable mold segment.

13. An apparatus as in claim 8 wherein the means for pushing the tread off the core comprises a plurality of axially movable and radially retractable tread pushing elements.

14. An apparatus as in claim 13 further including an axially movable annular ring, the tread pushing elements being attached to the annular ring.

15. The apparatus as in claim 14, further including:
   an upper plate assembly;
   a plurality of slidable push rods; and
   a means attached to the upper plate assembly for moving the upper plate, the plurality of push rods and the annular ring in an axial direction.

* * * * *